United States Patent [19]

Ozaki et al.

[11] Patent Number: 4,746,468

[45] Date of Patent: May 24, 1988

[54] METHOD OF PREPARING CERAMIC MICROSPHERES

[75] Inventors: Yoshiharu Ozaki, Musashino; Mitsushi Wadasako, Hashima; Toshihiro Kasai, Tokyo; Yoshinori Shinohara, Saitama, all of Japan

[73] Assignee: Mitsubishi Mining & Cement Co., Ltd., Tokyo, Japan

[21] Appl. No.: 864,015

[22] Filed: May 16, 1986

[30] Foreign Application Priority Data

May 17, 1985 [JP] Japan .................. 60-103824

[51] Int. Cl.⁴ .................. B29B 9/08; C04B 35/64
[52] U.S. Cl. .................. 264/9; 264/23; 264/63
[58] Field of Search .................. 423/608, 625; 501/94, 501/103, 127; 264/13, 24, 125, 23, 5, 9, 63

[56] References Cited

U.S. PATENT DOCUMENTS

| | | | |
|---|---|---|---|
| 2,666,749 | 1/1954 | Hoekstra | 423/628 |
| 3,346,336 | 10/1967 | Hayes | 423/628 |
| 3,350,482 | 10/1967 | Bowers | 264/13 |
| 3,373,232 | 3/1968 | Wise | 264/13 |
| 3,535,264 | 10/1970 | Hackstein et al. | 423/608 |
| 3,773,885 | 11/1973 | Boone | 264/236 |
| 3,787,550 | 1/1974 | McGillvary et al. | 264/236 |
| 3,939,233 | 2/1976 | Bildstein et al. | 264/13 |
| 3,970,580 | 7/1976 | Zimmer | 264/13 |

FOREIGN PATENT DOCUMENTS 5784731 1/1982 Japan.

*Primary Examiner*—James Lowe
*Assistant Examiner*—J. F. Durkin, II
*Attorney, Agent, or Firm*—Toren, McGeady & Associates

[57] ABSTRACT

A manufacturing method for ceramic microspheres including the steps of; forming a suspension of ceramic fine powders as a dispersed phase and water as a dispersion medium; dispersing the suspension as droplets in a high boiling point liquid which has substantially the same specific gravity as the suspension and which is immiscible with water and nonreactive with the ceramic fine powder to make spherical particles; and subjecting the resultant product to drying and calcination.

25 Claims, No Drawings

METHOD OF PREPARING CERAMIC MICROSPHERES

BACKGROUND OF THE INVENTION

1. Field of the Invention

This invention relates to a method of preparing ceramic microspheres, more particularly to a method of enabling substantial reduction of equipment size and preparation of microspheres even with ceramics which cannot be transformed into sol.

2. Description of the Related Art

Ceramic microspheres are fine, spherical particles. When used as fillers dispersed in other media, they enable a high filling degree because of the narrow space between particles. When used as sintered bodies formed into various shapes, shaping is easy because of the excellent flow property.

In the known method for preparing ceramic microspheres, the sol of ceramic materials is dropped into a single kind of liquid to form spherical shapes. However this method has a problem, i.e., the need for a long dropping height from the liquid level in order to obtain true spheres, resulting in a large size of the equipment. As a method to solve these problems, Japanese Unexamined Published Patent Application No. 57-84731 discloses the steps of dropping the colloidal sol of ceramic materials into a solution consisting of two layers; a high boiling point liquid which has lower specific gravity than the sol and which is immiscible with water and a liquid with a higher specific gravity than the sol so as to make the spheres and subjecting the resultant product to drying and calcination. This method is capable of making true spheres at a short dropping height from the liquid level, and consequently enables preparation of ceramic microspheres by means of small-sized equipment.

However, the ceramic material for this method is limited to material transformable into colloidal sol. This method cannot be used for ceramic materials not transformable into sol, namely those whose solid particles easily precipitate when dispersed in a liquid.

Also, in this method, the sol dispersed in the high boiling point liquid first must completely gelatinize on the boundary surface of the two liquids before they fall in the lower layer liquid to make the spherical particles. Therefore, the dispersed sol tends to stagnate on the boundary surface of the two liquids, this is troublesome in that the dropped quantity of the sol must be controlled according to the quantity of the spherical particles formed.

SUMMARY OF THE INVENTION

The present inventors have observed this and realized that by making the specific gravity of the high boiling point liquid equal to that of the droplets, the settling velocity of the suspension droplets of ceramic fine powders in the high boiling point liquid can be delayed.

An object of this invention is to provide a method of easily preparing ceramic microspheres by means of small-sized equipment, even ceramic materials not transformable into sol. A further object of this invention is to provide a method of preparing ceramic microspheres enabling easy adjustment of the dropped quantity of the sol dispersed in the high boiling point liquid.

This invention provides a method of preparing ceramic microspheres which comprises the steps of; forming a suspension of ceramic fine powders as a dispersed phase and water as a dispersion medium; dispersing the suspension as droplets in a high boiling point liquid which has substantially the same specific gravity as the suspension and which is immiscible with water and nonreactive with the ceramic fine powder to make spherical particles; and subjecting the resultant product to drying and calcination.

DESCRIPTION OF THE PREFERRED EMBODIMENT

As the ceramic fine powder for this invention, various ceramic fine powders produced by known methods can be employed, such as fine powders obtained by milling coarse particles or prepared in liquid phase. In particular, ceramic fine powders produced by hydrolyzing metal alkoxide to thereby react in liquid phase have high purity and uniform stability. Therefore, these become a uniform and stable dispersion phase in the suspension of this invention.

The suspension for this method consists of ceramic fine powders as a dispersed phase and water as a dispersion medium. The ceramic fine powders may be dispersed in water by means of ultrasonic waves to obtain a more uniform suspension thereof. When hydrolysis products of metal alkoxide are used as the dispersed phase, by-products of the hydrolysis, such as alcohol and benzene, should be removed. A little amount of a surface active agent may be mixed into the suspension in order to prevent coalescence caused by the secondary cohesion of the dropping liquid, to sufficiently disperse the dropping liquid, and to obtain smooth and truly spherical ceramic particles. Either a nonionic surface active agent or anionic surface active agent may be used. Furthermore an organic binder may be mixed into the suspension in order to maintain the shape of spherical particles in a sintering process. The mixing quantity of the organic binder is preferably in the range of from 10 wt. % to 30 wt. % against the solid part of the suspension. An excess of the binder tends to destroy the sphericity in the sintering process, and a lack of the binder makes difficult aftertreatment, such as washing and drying of the spherical particles. This organic binder may be a water-soluble binder.

The thus formed suspension is dispersed as droplets in the high boiling point liquid. In order to vaporize water earlier from the spherical particles formed in the high boiling point liquid, as mentioned later, the high boiling point liquid is a liquid having a boiling point higher than that of water. The above high boiling point liquid is selected among liquids which have substantially the same specific gravity as the suspension and which is immiscible with water, nonreactive with the above-mentioned ceramic fine powder, and adjustable easily in specific gravity, such as ethyl phthalate—n-butyl phthalate and ethyl phthalate—dioctyle phthalate. The viscosity of the dropped suspension does not necessarily have to be any specific value. Under conditions of the moderate thixotropy, the dropped suspension begins to form into spherical particles by dispersing in the high boiling point liquid. The size of the spherical particles is decided according to the orifice bore and the concentration of the suspension. The orifice bore is preferably in the range of from 0.30 mm$\phi$ to 1.10 mm$\phi$. The concentration of the suspension has more influence on the size of the spherical particles than the orifice bore. The conditions for dispersion of the dropped suspension are preferably a temperature in the range of from 0° C. to 30° C. and a normal pressure. The temperature of the suspension is preferably as low as possible until the droplets transform into spherical shapes so as to make up truly spherical particles.

Dispersing the suspension as droplets in the high boiling point liquid, the droplets transform into spherical particles, not settling, but suspended in the high boiling point liquid, because the droplets have substantially the same specific gravity as the high boiling liquid. Addition of a surface active agent to the suspension can prevent the coalescence of the particles.

Heating, at a temperature in the range of from 70° C. to 80° C., the high boiling point liquid in which spherical particles have been formed vaporizes water from the spherical particles. The high boiling point liquid is filtered if necessary, thereafter the spherical particles are washed with alcohol and isolated. After drying at a normal temperature and pressure, the spherical particles are sintered at a temperature in the range of from 1000° C. to 1300° C. and at normal pressure to thereby obtain the ceramic microspheres. When mixing an organic binder into the suspension, the organic binder can be removed from the ceramic microspheres by the above-mentioned sintering process.

As described in the foregoing, by dispersing an aqueous suspension of ceramic fine powders as droplets in a high boiling point liquid which has substantially the same specific gravity as the suspension and which is immiscible with water and nonreactive with the ceramic fine powder, ceramic microspheres can be easily prepared, even ceramic materials not transformable into sol. Furthermore, since the residence time of the droplets suspended in the high boiling point liquid is longer than in the prior art, this method does not require a long dropping height from the liquid level to make sphericity as in a single kind of liquid as in the prior art. Consequently truly spherical particles can be obtained at a short dropping height from the liquid level.

Moreover, since formation of spherical particles in a single kind of high boiling point liquid is carried out not intermittently, but continuously, the dropped amount of the suspension can be easily adjusted and ceramic microspheres with uniform size can be obtained.

This invention will be described more specifically referring to embodiments.

EXAMPLE 1

To 97 mol of zirconium butoxide ($Zr(OBu^n)_4$ was added 3 mol of yttrium isopropoxide ($Y(OPr^i)_3$). Excessive butanol and isopropyl alcohol in the resulting solution were substituted for toluene. While flowing back the above solution at 80° C., distilled and decarbonated water is dropped gradually and sufficiently into the solution so as to hydrolyze. subsequently, toluene, used as a solvent, and the by-product butanol and isopropyl alcohol were removed by means of an evaporator. Thus, a system composed of zirconium oxide ($ZrO_2$) and water was obtained. The mean particle size of the zirconium oxide was 0.005 $\mu$m.

A surface active agent was added to the resulting system of zirconium oxide and water. Further, the zirconium oxide in the above solution was made to disperse in the water uniformly by means of ultrasonic waves, thereby forming a suspension. To the thus obtained suspension was added aqueous polyvinyl alcohol as an organic binder in an amount 20 wt. % against the solid part thereof. The resulting solution was mixed sufficiently to form a slurry.

The above slurry had a specific gravity of 1.05. The mixing ratio of ethyl phthalate and dioctyl phthalate, i.e., the high boiling point liquid, was adjusted so as to make the specific gravity of the liquid substantially equal to that of the slurry. The slurry was dropped at a normal temperature and pressure into the high boiling point liquid from an orifice having an 0.50 mm$\phi$ orifice bore and was allowed to disperse. The dropped slurry transformed easily into spherical particles while suspended in the high boiling point liquid. The high boiling point liquid in which the spherical particles had been transformed was placed in a water bath and heated at normal pressure and 80° C. to evaporate the water from the spherical particles, thereby obtaining $ZrO_2$—PVA microspheres. The thus obtained $ZrO_2$—PVA microspheres were sintered at 1000° C., thereby obtaining $ZrO_2$ microspheres. Observation by means of X-ray diffraction indicated that the spherical particles were amorphous under the condition of $ZrO_2$—PVA microsheres, began to crystallize from 400° C., and transformed into a perfect crystalline substance at 1000° C. Observation by means of electron microscope indicated that the spherical particles transformed into truly spherical ones of about 50 $\mu$m particle size under the condition of $ZrO_2$—PVA microspheres and into uniform, smooth truly spherical ones of about 40 $\mu$m particle size after sintering at 1000° C.

EXAMPLE 2

20 g of commercially available $\gamma$-alumina powder of 0.03 $\mu$m mean particle size was placed into 80 ml of water to which the surface active agent described in Example 1 had been added. Then, the $\gamma$-alumina powder was made to disperse uniformly by means of ultrasonic waves in the same manner as in Example 1, thereby forming a suspension.

To the thus obtained suspension was added the organic binder described in Example 1 in an amount 10 wt. % against the $\gamma$-alumina powder. The specific gravity of the above slurry was 1.00. The mixing ratio of ethyl phthalate and n-butyl phthalate, i.e., the high boiling point liquid, was adjusted so as to make the specific gravity of the liquid substantially equal to that of the slurry. The slurry was dropped at a normal temperature and pressure into the high boiling point liquid from the orifice described in Example 1 and was allowed to disperse. the dropped slurry transformed easily into spherical particles while suspended in the high boiling point liquid. The high boiling point liquid in which the spherical particles had been transformed was heated in the same manner as in Example 1 to evaporate the water from the spherical particles, thereby obtaining $\gamma$-$Al_2O_3$—PVA microspheres. The thus obtained $\gamma$-$Al_2O_3$—PVA was sintered at 1300° C., thereby obtaining $\alpha$-$Al_2O_3$ microspheres. Observation by means of electron microscope indicated that the spherical particles transformed into truly spherical ones of about 70 $\mu$m particle size under the condition of $\gamma$—$Al_2O_3$—PVA microspheres and into uniform, smooth truly spherical ones of about 60 $\mu$m particle size after sintering at 1300° C.

What is claimed is:

1. A method for producing ceramic microspheres comprising in combination the steps of forming a mechanical suspension of a ceramic fine powder in water, dispersing said suspension in droplet form into a liquid medium which is immiscible with water, non-reactive with the fine powder, has substantially the specific gravity as the suspension, and has a boiling point higher than water, to form spherical particles and drying and calcining the resultant particles.

2. The method of claim 1 wherein the water is vaporized from the spherical particles by heating the liquid medium to a temperature from 70° C. to 80° C.

3. The method of claim 1 or 2 wherein the spherical particles are filtered from the liquid medium and washed with alcohol.

4. The method of claim 1 wherein the spherical particles are sintered at a temperature from 1,000° C. to 1300° C.

5. The method of claim 1 wherein the liquid medium is a mixture of ethyl phthalate and n-butyl phthalate, or ethyl phthalate and dioctyl phthalate.

6. The method of claim 1 wherein the suspension is dispersed in droplet form through an orifice.

7. The method of claim 6 wherein the diameter of the orifice is in the range from 0.3 mm to 1.10 mm.

8. The method of claim 1 wherein dispersing the droplets is carried out at a temperature ranging from 0° C. to 30° C.

9. The method of claim 1 wherein a surface active agent is added to the suspension.

10. The method of claim 1 or 9 wherein an organic binder is added to the suspension.

11. The method of claim 10 wherein the organic binder is a water-soluble binder.

12. The method of claim 10 wherein the amount of organic binder is in the range from 10 to 30% by weight based on the solids in the suspension.

13. A method for the preparation of ceramic microspheres comprising in combination the steps of hydrolyzing metal alkoxide to produce a ceramic fine powder, forming a suspension thereof in water, dispersing the mechanical suspension in droplet form into a liquid medium which is immiscible in water, non-reactive with the fine powder, has substantially the same specific gravity as the suspension and has a boiling point higher than water to form spherical particles, and drying and calcining the resultant particles.

14. The method of claim 13 wherein the water is vaporized from the spherical particles by heating the liquid medium to a temperature from 70° C. to 80° C.

15. The method of claim 13 wherein the spherical particles are filtered from the liquid medium and washed with alcohol.

16. The method of claim 13 or 15 wherein the spherical particles are sintered at a temperature from 1,000° C. to 1300° C.

17. The method of claim 13 wherein the liquid medium is a mixture of ethyl phthalate and n-butyl phthalate, or ethyl phthalate and dioctyl phthalate.

18. The method of claim 13 wherein the suspension is dispersed in droplet form through an orifice.

19. The method of claim 18 wherein the diameter of the orifice is in the range from 0.3 mm to 1.10 mm.

20. The method of claim 13 wherein dispersing the droplets is carried out at a temperature ranging from 0° C. to 30° C.

21. The method of claim 13 wherein a surface active agent is added to the suspension.

22. The method of claim 13 or 21 wherein an organic binder is added to the suspension.

23. The method of claim 22 wherein the organic binder is a water-soluble binder.

24. The method of claim 22 wherein the amount of organic binder is in the range from 10 to 30% by weight based on the solids in the suspension.

25. The method of claim 13 wherein the suspension is treated with ultrasonic waves.

* * * * *